United States Patent
Baron et al.

(10) Patent No.: US 7,286,613 B2
(45) Date of Patent: Oct. 23, 2007

(54) PROCESS AND DEVICE FOR MODULATING A CARRIER WITH AMPLITUDE AND PHASE ERROR COMPENSATION

(75) Inventors: François Baron, Cesson Sévigné (FR); Jean-Yves Le Naour, Pace (FR); Jean-Luc Robert, Betton (FR)

(73) Assignee: Thomson Licensing, Boulogne-Billancourt (FR)

( * ) Notice: Subject to any disclaimer, the term of this patent is extended or adjusted under 35 U.S.C. 154(b) by 840 days.

(21) Appl. No.: 10/655,442

(22) Filed: Sep. 4, 2003

(65) Prior Publication Data

US 2004/0047431 A1    Mar. 11, 2004

(30) Foreign Application Priority Data

Sep. 5, 2002    (FR) ................... 02 11211

(51) Int. Cl.
*H04K 1/02*    (2006.01)
(52) U.S. Cl. .................. 375/296; 375/375; 375/297; 455/192.2; 455/110; 330/2; 330/129; 332/103
(58) Field of Classification Search ................ 375/296, 375/297; 455/192.2, 110; 330/2, 129; 332/103
See application file for complete search history.

(56) References Cited

U.S. PATENT DOCUMENTS

| | | | | |
|---|---|---|---|---|
| 5,144,258 A * | 9/1992 | Nakanishi et al. | ........... | 330/129 |
| 5,351,016 A * | 9/1994 | Dent | ........................ | 332/103 |
| 5,381,108 A * | 1/1995 | Whitmarsh et al. | ............ | 330/2 |
| 5,793,817 A * | 8/1998 | Wilson | ........................ | 375/297 |
| 5,847,619 A * | 12/1998 | Kirisawa | ..................... | 332/103 |
| 5,978,662 A | 11/1999 | Swales | ........................ | 455/126 |
| 6,570,933 B1 * | 5/2003 | Makinen | ...................... | 375/296 |
| 7,039,371 B2 * | 5/2006 | Le Naour et al. | ........... | 455/110 |
| 2002/0018531 A1 | 2/2002 | Ratto | ........................ | 375/297 |
| 2004/0047431 A1 * | 3/2004 | Baron et al. | ................ | 375/296 |
| 2005/0277395 A1 * | 12/2005 | Lo Hine Tong et al. | . | 455/192.2 |

FOREIGN PATENT DOCUMENTS

DE    19934215 C1    3/2001

OTHER PUBLICATIONS

French Search Report of Apr. 17, 2003.

* cited by examiner

*Primary Examiner*—Chieh M. Fan
*Assistant Examiner*—Sudhanshu C. Pathak
(74) *Attorney, Agent, or Firm*—Joseph J. Laks; Robert D. Shedd; Brian J. Cromarty

(57) ABSTRACT

The invention relates to processes and devices which make it possible to directly modulate an RF carrier with a quadrature signal. It consists in filtering (504) this quadrature signal around zero so as to introduce alternately (507, 508) on each of the channels a low-frequency subcarrier that will serve as reference. Each of these channels is alternately demodulated in a synchronous manner (519) cosine-wise and sine-wise. The demodulation signal is filtered (523) so as to recover the subcarrier marred by modulation errors. The measurement of these errors (524) allows feedback correction (503) of the quadrature signal. It makes it possible to perform the major part of the operations in the digital processor (501) and enables direct vector modulation to be made possible at millimeter frequencies.

5 Claims, 2 Drawing Sheets

PROCESS AND DEVICE FOR MODULATING A CARRIER WITH AMPLITUDE AND PHASE ERROR COMPENSATION

BACKGROUND OF THE INVENTION

1. Field of the Invention

The present invention concerns processes for modulating a carrier, more particularly an RF carrier, and in which the amplitude and phase errors engendered during this modulation are compensated for.

It also relates to devices that make it possible to perform such modulation with such compensation. It applies mainly in satellite-based bidirectional multimedia communication systems, in particular those using the Ku band or the Ka band. It also relates to LMDS (standing for Local Multipoint Distribution System) type RF transmission systems.

2. Related Art

RF modulation is conventionally performed using a series of changes of frequency based on one or more local oscillators, this being complex and expensive.

It would be beneficial to dispense with these changes of frequency by performing direct vector modulation. This solution would be both simple and particularly inexpensive to effect. It is however limited by the phase and amplitude imbalances engendered by the modulators, particularly at millimeter frequencies when using relatively big frequency bands. These imbalances stem on the one hand from the static spread in hardware, and on the other hand from various drifting, in particular due to temperature.

To compensate for the static spread due to the hardware, one conventionally uses methods consisting in measuring this spread in the factory and in introducing an inverse spread, for example by programming a PROM specific to each modulator at the digital signal processing level. This method has the drawback of being expensive.

To compensate for the other types of defects, as well as possibly for the static spread, it is also possible to use a dynamic calibration system comprising a vector demodulator, as represented in FIG. 1.

In this figure, a digital signal processing system 101, known by the name DSP, directly calculates the modulation signals I and Q. These are then converted into analogue in converters 102 and 103, amplified in gain-control amplifiers 104 and 105 and then filtered in filters 106 and 107.

A local oscillator 108 delivers a carrier frequency which is multiplied by the signal I in a multiplier 109, and after phase-shifting by a variable phase-shifter 110 and a 90-degree phase-shifter 111 by the signal Q in a multiplier 112.

The output signals from the multipliers 109 and 112 are summed in a summator 113 then amplified in an output amplifier 114.

An output coupler 115 makes it possible to tap off a fraction of the output signal from the amplifier 114 so as to apply it to a vector demodulator 116 which makes it possible to detect the errors of phase and of amplitude.

The amplitude error is applied to the gain controls of the amplifiers 104 and 105 and the phase error to the gain control of the variable phase-shifter 110.

To actually determine the errors it is necessary to send a calibrated signal from time to time, this having the drawback of then interrupting the transmission of the useful signal.

In the frequency domain considered, that is to say the millimeter domain, the phase-shifters, the variable one 110 and also the 90-degree one 111, cannot be made with the desired accuracy, that is to say a degree. Furthermore, the vector demodulator 116 is itself marred by quadrature defects, thereby disturbing the correction. Such an architecture is therefore not conceivable in these millimeter frequencies.

SUMMARY OF THE INVENTION

To be able to perform direct RF modulation such as this, the invention proposes a process for the modulation of a carrier, in particular an RF carrier, in which two quadrature components I and Q are generated and a local frequency is vectorially modulated with these components. According to a main characteristic of the invention, the signal I or Q is filtered around the zero frequency so as to create a small free frequency band; into this small free frequency band are inserted alternately into the signal I and into the signal Q a low-frequency subcarrier sufficiently remote from zero as not to engender any shift error of the continuous component and of a sufficiently low relative level with respect to that of the signal I or Q as not to disturb the latter; a fraction of the vectorially modulated signal is demodulated in a synchronous manner with the same local frequency alternately cosine-wise and sine-wise; a low-pass filtering is carried out on the demodulation signal so as to extract the subcarrier marred by amplitude and phase errors corresponding successively to the amplitude and phase errors with which the signals I and Q are marred after the vector modulation; these amplitude and phase errors are measured; and the initial components I and Q are feedback-corrected on the basis of these measurements so as to compensate for these errors.

According to another characteristic, all the operations, with the exception of the vector modulation, of the generation of the local frequency, of the demodulation and of the low-pass filter, are performed digitally.

According to another characteristic, the generation of the local frequency is done by the addition to an RF frequency of a reference frequency F1 low enough to be generated digitally sine-wise and cosine-wise.

The invention also proposes a device for modulating a carrier, in particular an RF carrier, comprising a digital processor for generating two quadrature components I and Q, a local base frequency generator and a vector modulator for modulating this local frequency by these two components. The device furthermore comprises means of filtering of the signal I or Q around the zero frequency, a generator of a low-frequency subcarrier, means for inserting this subcarrier alternately into the signal I and into the signal Q, means for demodulating a fraction of the output signal from the vector modulator with the local frequency in a synchronous manner alternately cosine-wise and sine-wise, a filter for extracting the subcarrier marred by amplitude and phase errors from the demodulated signal, means for measuring these amplitude and phase errors, and means for correcting the initial components I and Q on the basis of these measurements so as to compensate for these errors.

According to another characteristic, this device comprises means for generating a complementary local frequency low enough to be processed by the digital processor, means for adding this complementary local frequency to the base local frequency, means for digitally phase-shifting alternately cosine-wise and sine-wise the said complementary local frequency useful for demodulation, means for adding this local frequency thus phase-shifted to the base local frequency so as to energize the means of synchronous demodulation.

BRIEF DESCRIPTION OF THE DRAWINGS

Other features and advantages of the invention will become clearly apparent in the following description, presented by way of non limiting example with regard to the appended figures which represent.

DESCRIPTION OF A PREFERRED EMBODIMENT

Figure 2:
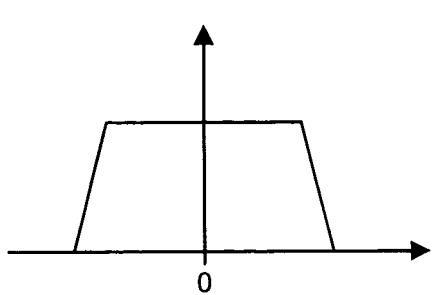
FIG. 2, the baseband spectrum of a modulation signal I and Q.

The baseband spectrum of the signals I and Q that are used in such a type of modulation is represented in a known manner in FIG. 2.

Figure 3:
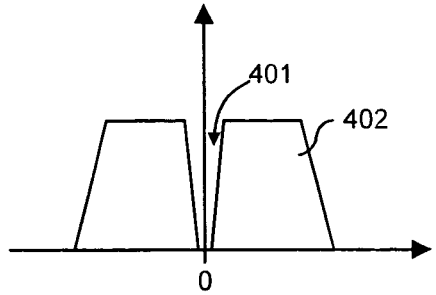
FIG. 3, the spectrum of the same signal after filtering according to the invention.

The process according to the invention proposes in a first step that part of this signal around the zero frequency be eliminated, as represented in FIG. 3.

This operation is carried out by digital filtering in the signal processor in the case of 4QAM type modulation, by way of example. By eliminating a very small frequency band compared with the useful band of the signal, the error made with regard to the useful signal then remains of second order.

In the case of the use of multicarrier type modulation, such as for example the OFDM (Orthogonal Frequency Division Multiplexing) type, it is quite simply sufficient to extinguish the carriers around 0, all of the useful signal located at this spot being carried over by coding into the other carriers.

Figure 4:
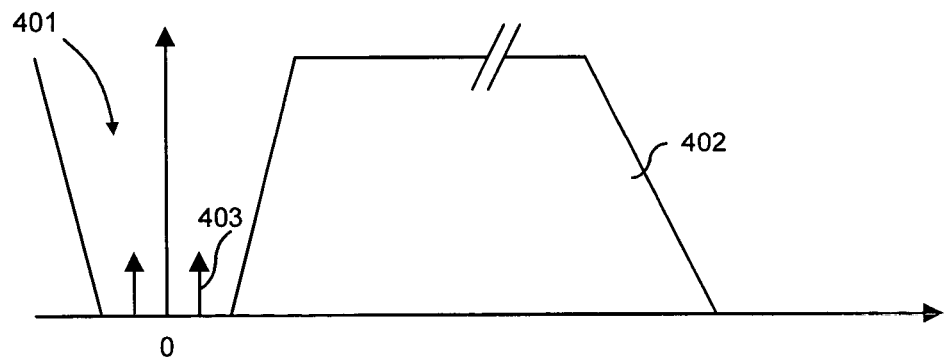
FIG. 4, a partial view of the spectrum of this same signal after filtering and insertion of a reference subcarrier.

As represented in FIG. 4, the invention next proposes that a subcarrier 403 be inserted into the trough 401 thus made between the zero frequency and the remainder of the baseband 402. This subcarrier is sufficiently remote from the zero as not to engender the well-known errors due to the shifting ("offset") of the continuous component. Furthermore its relative level is sufficiently low with respect to that of the baseband 402 as not to disturb the latter.

This subcarrier, which is sent continuously with a particular sequence described later, is used to measure the phase error and amplitude error and thus allow a feedback correction to be made by a process described with respect to the diagram of FIG. 5.

Figure 1:
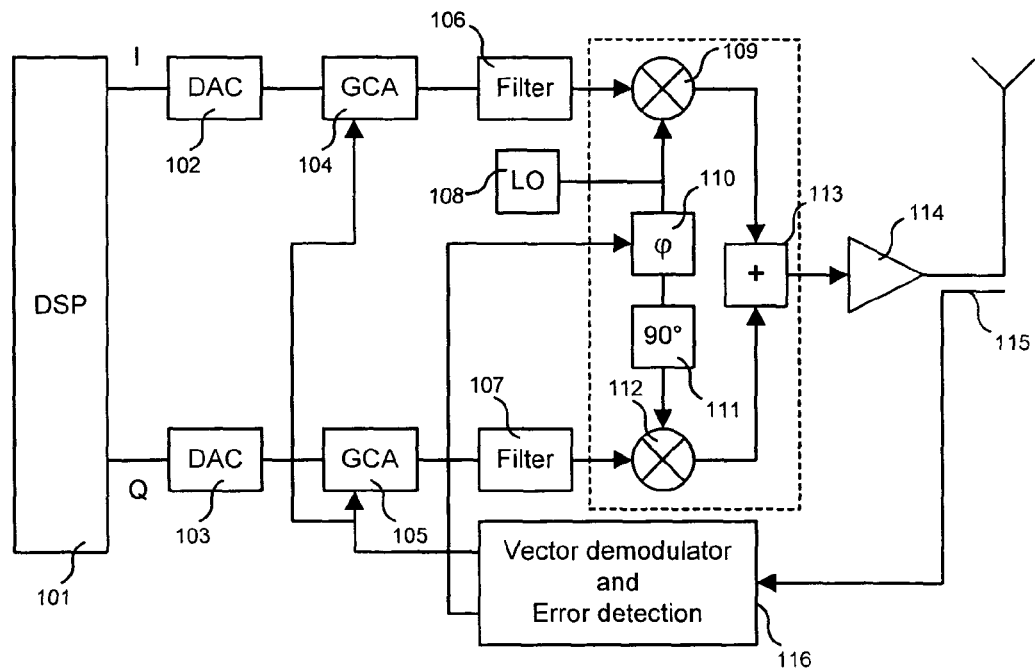
FIG. 1, a direct modulator with compensation, according to the known art.
Figure 5:
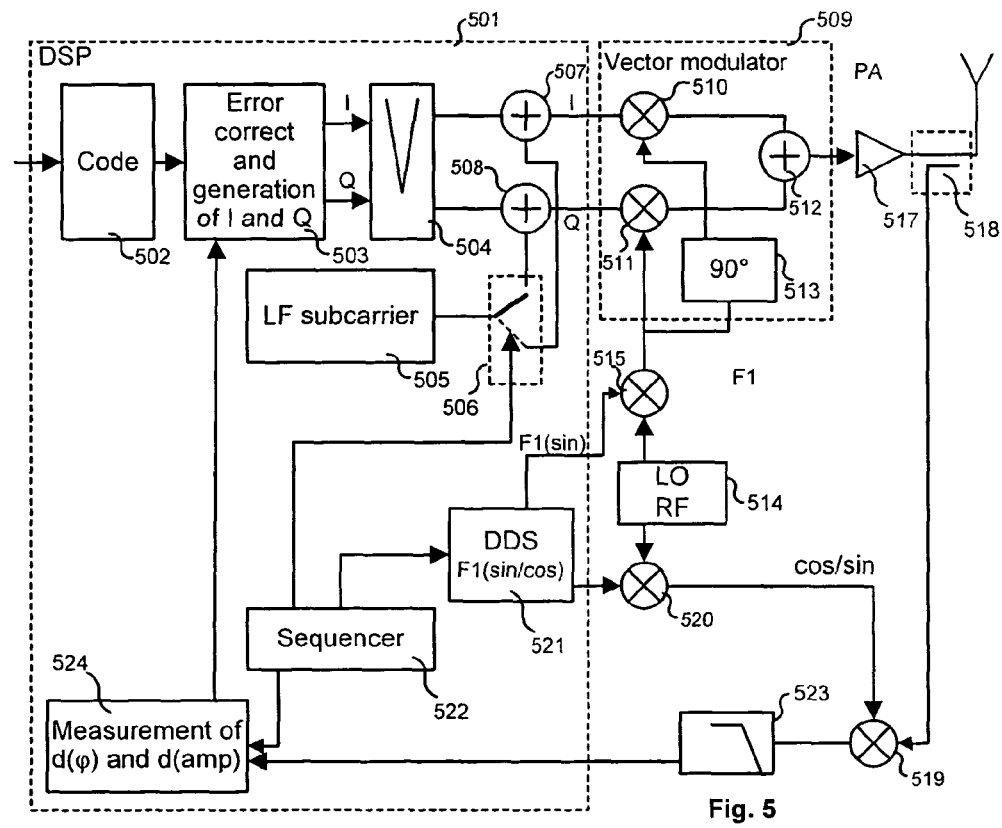
FIG. 5, the diagram of a direct modulator according to the invention.

As represented in FIG. 5, the essence of the correction operations is performed at the DSP processor 501 level. This operation, as well as all those that are performed in the DSP 501, is of course performed in a totally digital manner inside this DSP.

The inputs and outputs of the signals of this DSP are effected by way of analogue/digital and digital/analogue converters, that are not represented in the figure so as not to overburden the latter.

In this processor, the useful signals are generated in a known coding system 502 and then sent to a generator of the signals I and Q 503 which simultaneously performs the modulation error correction on the basis of an error signal obtained in the manner described hereinbelow.

These signals I and Q, which are in baseband, are then filtered in a filtering module 504 so as to obtain the spectrum of FIG. 3.

The low-frequency LF reference subcarrier 403 is generated by a generator 505.

It is then inserted with the aid of a switch 506 alternately into the signals I and Q by summators 507 and 508. The tempo of this insertion is determined by a clock signal delivered by a sequencer 522, so as to obtain the desired compensation tempo.

These signals I and Q therefore comprising this LF frequency are then applied to a vector modulator 509 which comprises in a conventional manner two multipliers 510 and 511, a 90-degree phase shifter 513 and an adder 512.

The carrier frequency is obtained from a local oscillator that delivers an RF frequency 514, by mixing with a complementary local reference frequency F1 generated by digital synthesis in the module 521 and which gets added to the frequency of the local oscillator 514 in a multiplier 515.

The modulated carrier wave obtained at the output of the modulator 509 is amplified by a power amplifier 517 and is then applied to the antenna.

At the output of the amplifier 517, a coupler 518 makes it possible to tap off a small fraction of the signal so as to send it to a multiplier 519 which plays the role of synchronous demodulator.

The demodulation frequency applied to this multiplier is the same as the modulation frequency and is obtained on the basis of the oscillator 514, of a generator at the frequency F1 and of a multiplier 520. However, this frequency F1 is delivered by a module 521 of the DSP 501 which affords a digital frequency synthesis function and which is known by the acronym DDS (Direct Digital Synthesis).

The module 521 delivers the frequency F1 applied to the mixer 515 which serves for the modulation (of sine phase only). This same frequency serves for the demodulation. For this purpose, the frequency F1 emanating from the module DDS is generated alternately with a phase shift of 90 degrees so as to represent either a sine or a cosine. The frequency F1 thus alternately phase-shifted is generated digitally in the module DDS of the processor DSP since it is necessary to have a rigorous phase shift of 90 degrees at the frequency F1 so as not to add any extra error into the demodulation intended to obtain the correction and this rigorous phase shift cannot be obtained with analogue means.

Since it is not possible with a digital processor to generate a millimeter frequency which toggles accurately from sine to cosine and vice-versa, provision is therefore made to use a lower frequency, of the order of 100 MHz for example, which can be generated by the processor and that is added to the frequency generated by the local oscillator 514.

This operation is performed in the module 521 under the control of a sequencer module 522. Provision may also be made for the sequencer module 522 to also deliver the clock signal causing the interrupter 506 to toggle, in such a way as to comply with the sequence described hereinbelow.

A low-pass filter 523 allows the LF subcarrier to be isolated very simply. The latter is shifted in amplitude and in phase with respect to the one that was injected into the adders 507 and 508. It is then sent to the processor 501 in which a module 524 makes it possible to measure the phase difference $d(\Phi)$ and amplitude difference $d(amp)$. These measurements are sent to the error corrector 501 which modifies the signals I and Q accordingly so as to be able to continuously correct the various errors, due in particular to the analogue units, in particular the vector modulator 509 in which the main error stems from the 90-degree phase shifter 513.

Figure 6:
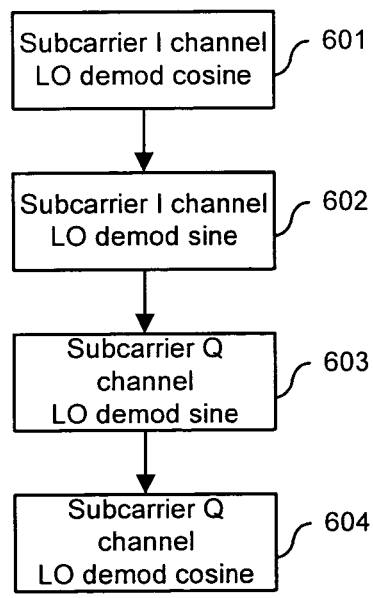
FIG. 6; a flowchart of a sequence for correcting errors according to the invention.
Figure 7:
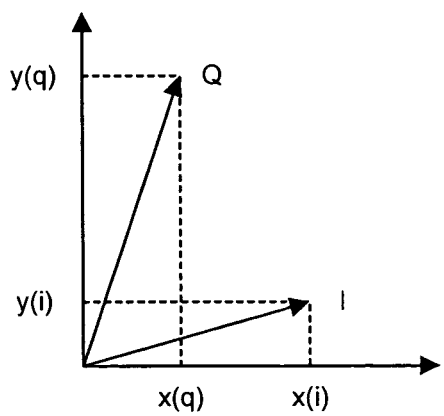
FIG. 7, a plot of the signals I and Q marred by these errors, and of the measurement of the latter.

To be able to separate the errors on the I and Q channels, the LF subcarrier is applied separately and successively to these two channels, as explained above. Since in each of these channels there is a phase error and amplitude error, to separate these two errors use is made of a sequence represented in FIG. 6 with respect to the plot of FIG. 7. This sequence is obtained on the basis of the sequencer 522.

The subcarrier of the I channel is firstly demodulated cosine-wise in step 601 and sine-wise in step 602. This makes it possible to obtain the coordinates x(i) and y(i) of the vector I, which make it possible to determine the phase error and amplitude error in this channel I.

The subcarrier of the Q channel is then demodulated cosine-wise and sine-wise in steps 603 and 604 so as to obtain the coordinates x(q) and y(q) of the vector Q.

These steps are performed in the module 524 under the control of the sequencer 522.

These coordinates then make it possible to calculate in this same module 524 the phase error and amplitude error, which are then applied to the correction module 501.

The process thus described therefore makes it possible to perform direct vector modulation, in particular at millimeter frequencies, which is not limited by the severe filtering constraints due to conventional frequency transposition structures. This makes it possible to simplify the architecture of the devices and hence to reduce their cost. The correction is not limited to errors stemming from the vector modulator, but it extends to the remainder of the chain, in particular to the power units which follow this vector modulator.

The quadrature signals I and Q are obtained on the basis of a digital processor, which makes it possible to eliminate the poor accuracy of the 90-degree phase shifters customarily used.

The low-frequency narrow filtering of the modulation signal so as to introduce therein a reference subcarrier makes it possible to obtain the correction without interrupting the transmission of the useful data.

The use of a single mixer using the frequency of the local transmission oscillator to sequentially demodulate the reference subcarrier phase-wise and quadrature-wise makes it possible to eliminate the errors customarily engendered by the correction loop itself.

The invention is particularly useful within the framework of point multipoint transmission systems in millimeter bands, but it may also be applied in any transmission system based on modulation of a carrier.

The invention claimed is:

1. A method of modulation of a carrier, in particular an RF carrier, in which two quadrature components I and Q are generated and a local frequency is vectorially modulated with these components, comprising: filtering the quadrature components I and Q around a zero frequency so as to create a small free frequency bands; inserting alternately into this small free frequency band, into the I and Q components, a low-frequency subcarrier sufficiently remote from the zero frequency so as not to engender any shift error of the continuous component and of a sufficiently low relative level with respect to that of the signal I and Q as not to disturb the latter; demodulating, a fraction of the vectorially modulated signal, in a synchronous manner with the same local frequency alternately cosine-wise and sine-wise; low-pass filtering the demodulated signal so as to extract the low-frequency subcarrier marred by a first set of amplitude and phase errors corresponding successively to a second set of amplitude and phase errors with which the signals I and Q are marred after the vector modulation; measuring said first set of amplitude and phase errors; and feedback correcting the two quadrature components I and Q to compensate for said second set of amplitude and phase errors.

2. The method of claim 1, wherein all the operations, with the exception of the vector modulation, of the generation of the local frequency, of the demodulation and of the low-pass filter, are performed digitally.

3. The method of claim 1, wherein the generation of the local frequency is done by the addition to an RF frequency of a reference frequency F1 low enough to be generated digitally sine-wise and cosine-wise.

4. A device for modulating a carrier, in particular an RF carrier, comprising: a digital processor for generating two quadrature components I and Q; a local base frequency generator; a vector modulator for modulating this local frequency by these two components; means for filtering of the two quadrature components I and Q around a zero frequency; means for generating a low-frequency subcarrier; means for inserting said low-frequency subcarrier alternately into the I and Q components; means for demodulating, a fraction of the output signal from the vector modulator with the local frequency in a synchronous manner alternately cosine-wise and sine-wise; a low-pass filter for filtering the demodulated signal so as to extract the low-frequency subcarrier marred by a first set of amplitude and phase errors corresponding successively to a second set of amplitude and phase errors with which the signals I and Q are marred after the vector modulation; means for measuring said first set of amplitude and phase errors; and means for feedback correcting the two quadrature components I and Q on the basis of said measurements so as to compensate for said second amplitude and phase errors.

5. The device of claim 4, which further comprises: means for generating a complementary local frequency low enough to be processed by the digital processor, means for adding this complementary local frequency to the base local frequency, means for digitally phase-shifting alternately cosine-wise and sine-wise the said complementary local frequency useful for demodulation, means for adding this local frequency thus phase-shifted to the base local frequency so as to energize the means of synchronous demodulation.

* * * * *